US00RE40658E

(19) United States
(12) Reissued Patent
Powis et al.

(10) Patent Number: US RE40,658 E
(45) Date of Reissued Patent: Mar. 10, 2009

(54) METHODS AND APPARATUS FOR COOLING GAS TURBINE NOZZLES

(75) Inventors: Andrew Charles Powis, Madeira, OH (US); Jonathan Philip Clarke, West Chester, OH (US); Judd Dodge Tressler, Mason, OH (US)

(73) Assignee: General Electric Company, Schenectady, NY (US)

(21) Appl. No.: 11/287,565

(22) Filed: Nov. 23, 2005

Related U.S. Patent Documents

Reissue of:
(64) Patent No.: 6,652,220
Issued: Nov. 25, 2003
Appl. No.: 09/998,947
Filed: Nov. 15, 2001

(51) Int. Cl.
*F01D 9/06* (2006.01)

(52) U.S. Cl. ..... 415/1; 415/119; 415/191; 415/208.2; 416/96 A

(58) Field of Classification Search ..... 415/1, 415/115, 191, 208.2; 416/96 A
See application file for complete search history.

(56) References Cited

U.S. PATENT DOCUMENTS 4,126,405 A 11/1978 Bobo et al.
4,252,501 A 2/1981 Peill
4,297,077 A 10/1981 Durgin et al.
4,697,985 A 10/1987 Suzuki
5,249,920 A 10/1993 Shepherd et al.
5,372,476 A 12/1994 Hemmelgarn et al.
5,620,300 A 4/1997 Knuijt
5,662,160 A 9/1997 Correia et al.
5,669,757 A 9/1997 Brackett
5,848,854 A 12/1998 Brackett
6,099,245 A 8/2000 Bunker
6,164,656 A 12/2000 Frost
6,183,192 B1 * 2/2001 Tressler et al. ..... 415/115
6,193,465 B1 2/2001 Liotta et al.
6,318,963 B1 11/2001 Emery et al.
6,382,906 B1 * 5/2002 Brassfield et al. ..... 415/115

* cited by examiner

*Primary Examiner*—Ninh H Nguyen
(74) *Attorney, Agent, or Firm*—William Scott Andes; Armstrong Teasdale LLP

(57) ABSTRACT

A method for assembling a turbine nozzle for a gas turbine engine facilitates improving cooling efficiency of the turbine nozzle. The method includes providing a hollow doublet including a leading airfoil and a trailing airfoil coupled by at least one platform, wherein each airfoil includes a first sidewall and a second sidewall that extend between a respective leading and trailing edge. The method also includes inserting an insert into at least one of the airfoils, wherein the insert includes a first sidewall including a first plurality of cooling openings that extending therethrough, and a second sidewall including a second plurality of cooling openings extending therethrough, and wherein the first plurality of cooling openings facilitate more cooling of the airfoil than the second plurality of cooling openings.

24 Claims, 3 Drawing Sheets

METHODS AND APPARATUS FOR COOLING GAS TURBINE NOZZLES

Matter enclosed in heavy brackets [ ] appears in the original patent but forms no part of this reissue specification; matter printed in italics indicates the additions made by reissue.

BACKGROUND OF THE INVENTION

This invention relates generally to gas turbine engine nozzles and more particularly, to methods and apparatus for cooling gas turbine engine nozzles.

Gas turbine engines include combustors which ignite fuel-air mixtures which are then channeled through a turbine nozzle assembly towards a turbine. At lease some known turbine nozzle assemblies include a plurality of nozzles arranged circumferentially and configured as doublets. A turbine nozzle doublet includes a pair of circumferentially-spaced hollow airfoil vanes coupled by integrally-formed inner and outer band platforms.

The doublet type turbine nozzles facilitate improving durability and reducing leakage in comparison to non-doublet turbine nozzles. Furthermore, turbine nozzle doublets also facilitate reducing manufacturing and assembly costs. In addition, because such turbine nozzles are subjected to high temperatures and may be subjected to high mechanical loads, at least some known doublets include an identical insert installed within each airfoil vane cavity to distribute cooling air supplied internally to each airfoil vane. The inserts include a plurality of openings extending through each side of the insert.

In a turbine nozzle, the temperature of the external gas is higher on the pressure-side than on the suction-side of each airfoil vane. Because the openings are arranged symmetrically between the opposite insert sides, the openings facilitate distributing the cooling air throughout the airfoil vane cavity to facilitate achieving approximately the same operating temperature on opposite sides of each airfoil. However, because of the construction of the doublet, mechanical loads and thermal stresses may still be induced unequally across the turbine nozzle. In particular, because of the orientation of the turbine nozzle with respect to the flowpath, typically the mechanical and thermal stresses induced to the trailing doublet airfoil vane are higher than those induced to the leading doublet airfoil vane. Over time, continued operation with an unequal distribution of stresses within the nozzle may shorten a useful life of the nozzle.

BRIEF SUMMARY OF THE INVENTION

In one aspect of the invention, a method for assembling a turbine nozzle for a gas turbine engine is provided. The method includes providing a hollow doublet including a leading airfoil vane and a trailing airfoil vane coupled by at least one platform, wherein each airfoil vane includes a first sidewall and a second sidewall that extend between a respective leading and trailing edge. The method also includes inserting an insert into at least one of the airfoil vanes, wherein the insert includes a first sidewall including a first plurality of cooling openings that extend therethrough, and a second sidewall including a second plurality of cooling openings extending therethrough.

In another aspect, a method of operating a gas turbine engine is provided. The method includes directing fluid flow through the engine using at least one turbine airfoil nozzle that includes a leading airfoil and a trailing airfoil coupled by at least one platform that is formed integrally with the leading and trailing airfoils, and wherein each respective airfoil includes a first sidewall and a second sidewall that extend between respective leading and trailing edges to define a cavity therein. The method also includes directing cooling air into the turbine airfoil nozzle such that the nozzle trailing airfoil is cooled more than the leading airfoil.

In a further aspect of the invention, a turbine nozzle for a gas turbine engine is provided. The nozzle includes a pair of identical airfoil vanes coupled by at least one platform formed integrally with the airfoil vanes. Each airfoil vane includes a first sidewall and a second sidewall that are connected at a leading edge and a trailing edge, such that a cavity is defined therebetween. The nozzle also includes at least one insert that is configured to be inserted within the airfoil vane cavity and includes a first sidewall and a second sidewall. The insert first sidewall includes a first plurality of openings extending therethrough for directing cooling air towards at least one of the airfoil vane first and second sidewalls. The insert second sidewall includes a second plurality of openings that extend therethrough for directing cooling air towards at least one of the airfoil vane first and second sidewalls. The first plurality of openings are configured to facilitate lower metal temperatures therefrom than the second plurality of openings.

DETAILED DESCRIPTION OF THE INVENTION

Figure 1:
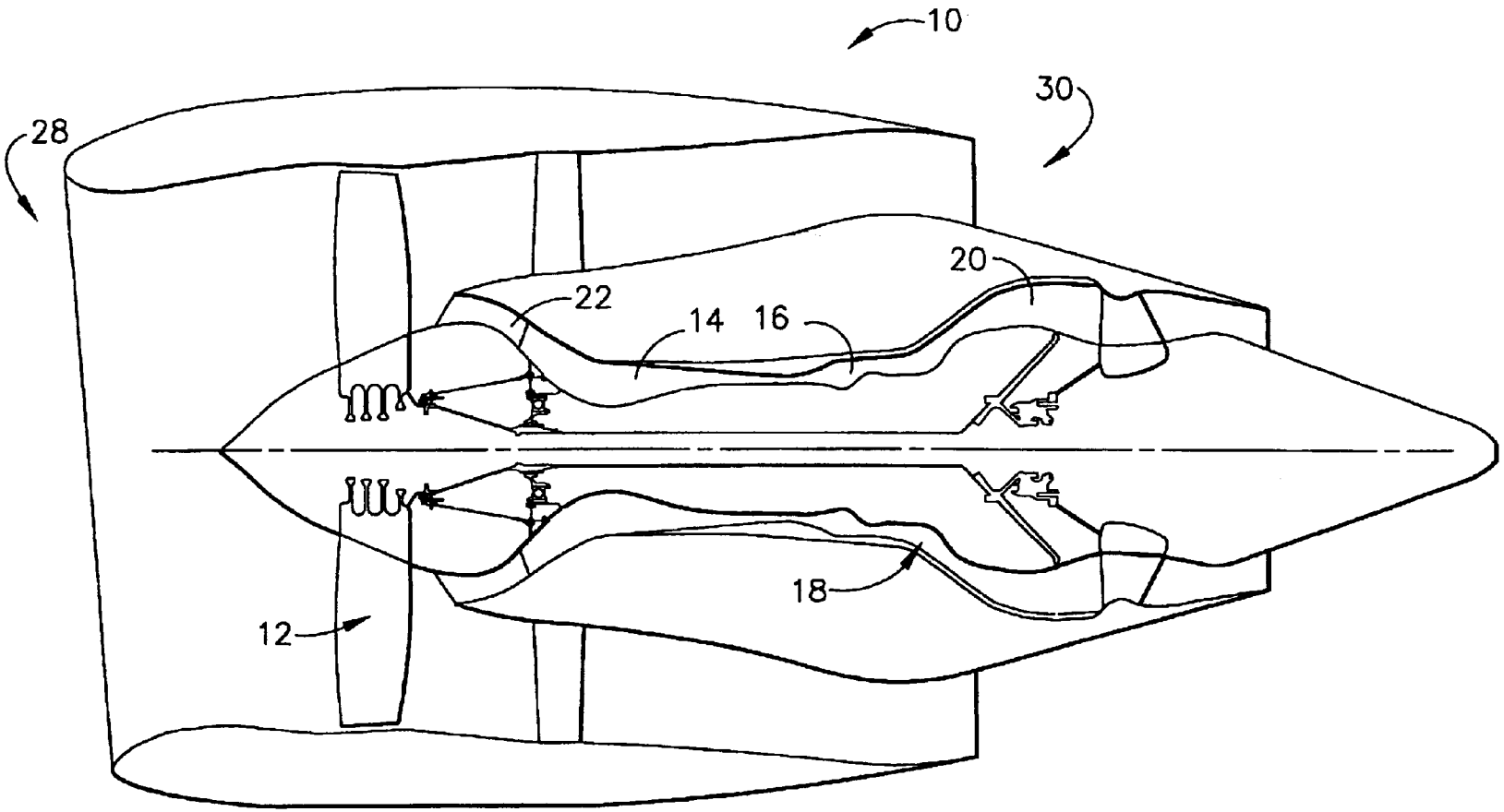
FIG. 1 is a schematic illustration of a gas turbine engine.

FIG. 1 is a schematic illustration of a gas turbine engine 10 including a fan assembly 12, a high-pressure compressor 14, and a combustor 16. Engine 10 also includes a high-pressure turbine 18 and a low-pressure turbine 20. Engine 10 has an intake, or upstream, side 28 and an exhaust, or downstream, side 30. In one embodiment, engine 10 is a CF6-80 engine commercially available from General Electric Aircraft Engines, Cincinnati, Ohio.

In operation, air flows through fan assembly 12 and compressed air is supplied to high-pressure compressor 14. The highly compressed air is delivered to combustor 16. Airflow from combustor 16 is discharged through a turbine nozzle assembly (not shown in FIG. 1) that includes a plurality of nozzles (not shown in FIG. 1) and used to drive turbines 18 and 20. Turbine 20, in turn, drives fan assembly 12, and turbine 18 drives high-pressure compressor 14.

Figure 2:
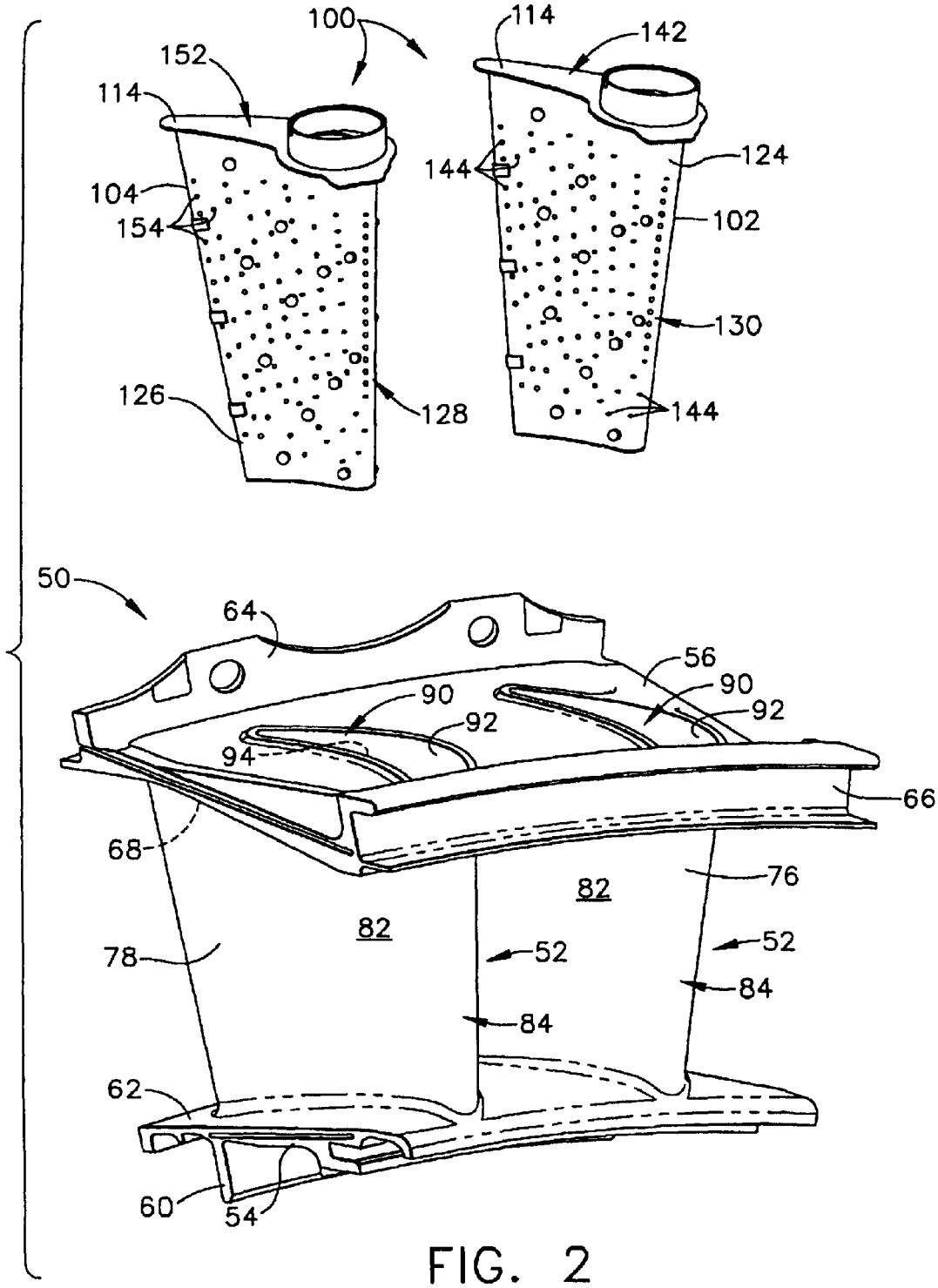
FIG. 2 is an exploded perspective forward-looking-aft view of turbine nozzle that may be used with the gas turbine engine shown in FIG. 1.
Figure 3:
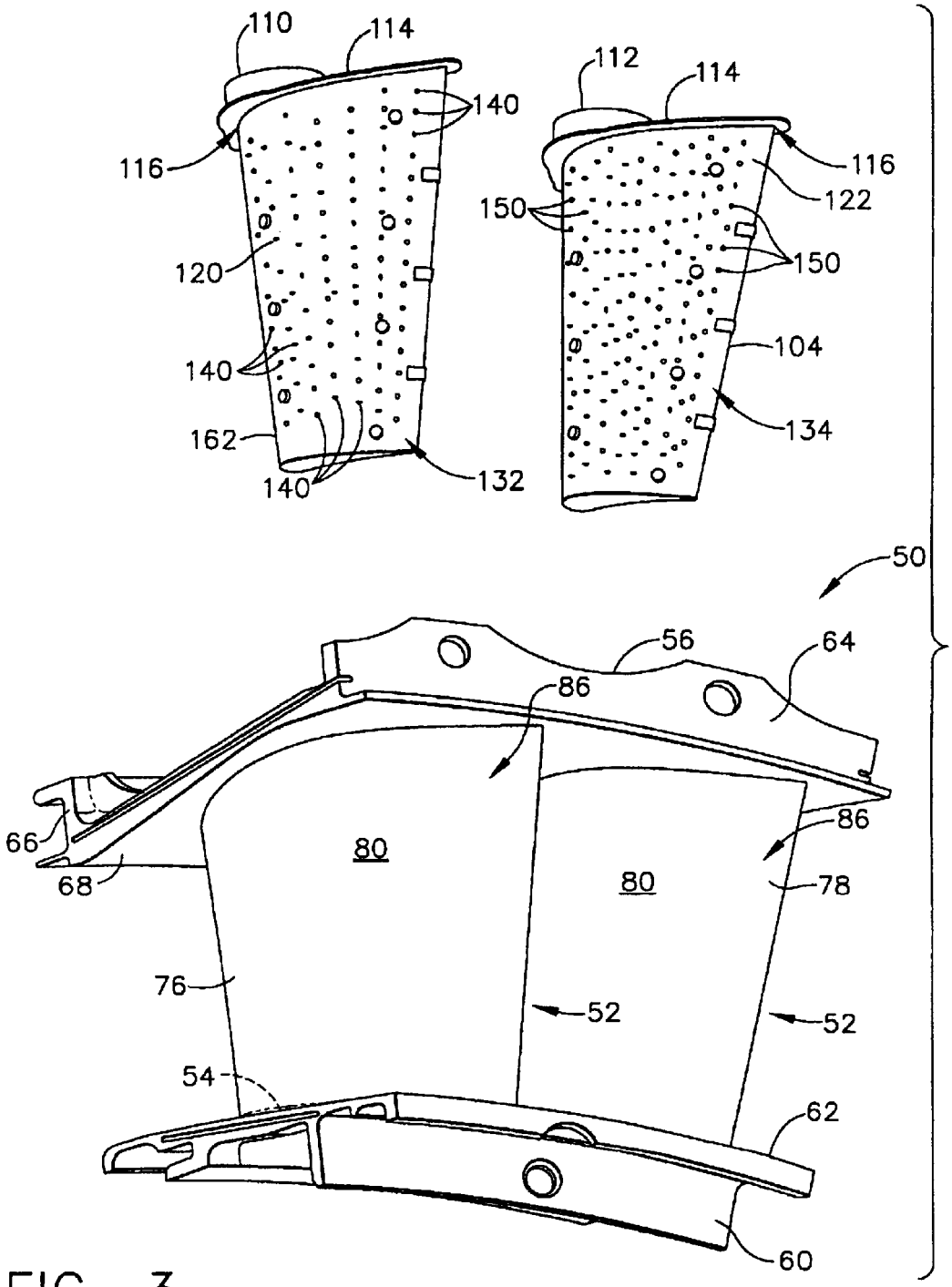
FIG. 3 is an exploded perspective aft-looking-forward view of the turbine nozzle shown in FIG. 2.

FIG. 2 is an exploded perspective forward-looking-aft view of turbine nozzle 50 that may be used with gas turbine engine 10 (shown in FIG. 1). FIG. 3 is an exploded perspective aft-looking-forward view of turbine nozzle 50. Nozzle 50 is known as a doublet and includes a pair of circumferentially-spaced airfoil vanes 52 coupled together by an arcuate radially outer band or platform 56 and an arcuate radially inner band or platform 54. More specifically, in the exemplary embodiment, each band 54 and 56 is formed integrally with airfoil vanes 52.

Inner band 54 includes a retention flange 60 that extends radially inwardly therefrom. More specifically, flange 60 extends substantially perpendicularly from band 54 with respect to a radially outer surface 62 of flange 60. Outer band 56 also includes a retention flange 64 that extends radially outwardly therefrom, and a leading edge flange 66 that also extends radially outwardly therefrom. More specifically, outer band retention flange 64 and leading edge flange 66 extend substantially perpendicularly from band 56 with respect to a radially inner surface 68 of band 56. Surfaces 62 and 68 define a radially outer and radially inner boundary for a flowpath through nozzle 50.

Airfoil vanes 52 are identical and include a leading airfoil vane 76 and a trailing airfoil vane 78. Each airfoil vane 52 includes a first sidewall 80 and a second sidewall 82. First sidewall 80 is convex and defines a suction side of each airfoil vane 76 and 78, and second sidewall 82 is concave and defines a pressure side of each airfoil vane 76 and 78. Sidewalls 80 and 82 are joined at a leading edge 84 and at an axially-spaced trailing edge 86 of each airfoil vane 76 and 78. More specifically, each airfoil trailing edge 86 is spaced chordwise and downstream from each respective airfoil leading edge 84.

First and second sidewalls 80 and 82, respectively, extend longitudinally, or radially outwardly, in span from radially inner band 54 to radially outer band 56. Additionally, first and second sidewalls 80 and 82, respectively, define a cooling chamber 90 within each airfoil vane 52. More specifically, chamber 90 is bounded by an inner surface 92 and 94 of each respective sidewall 80 and 82, and extends through each band 54 and 56.

Each cooling chamber 90 is sized to receive an insert 100 therein. More specifically, lead airfoil chamber 90 is sized to receive a lead insert 102, and trailing airfoil chamber 90 is sized to receive a trailing insert 104 therein. Inserts 102 and 104 are substantially similar and each includes a respective key feature 110 and 112, and an identical attachment flange 114. Flange 114 extends from a radially outer end 116 of each insert 102 and 104, and enables each insert 102 and 104 to be secured within each respective cooling chamber 90. In one embodiment, flange 114 is brazed to radially outer band 56. In another embodiment, flange 114 is welded to radially outer band 56.

Key features 110 and 112 extend through flange 114 at each insert radially outer end 116. Specifically, key features 110 and 112 are unique to each respective insert 102 and 104, and are sized to be received in a mating slot (not shown) that extends through nozzle radially outer band 56. More specifically, key features 110 and 112 prevent lead insert 102 from being inadvertently inserted within trailing airfoil vane 78, and prevent trailing insert 104 from being inadvertently inserted within leading airfoil vane 76.

Each insert 102 and 104 has a cross sectional profile that is substantially similar to that of a respective airfoil vane 76 and 78. More specifically, each insert 102 and 104 includes a first sidewall 120 and 122, respectively, and a second sidewall 124 and 126. Accordingly, each insert first sidewall 120 and 122 is adjacent each respective airfoil vane first sidewall 80 when each insert 102 and 104 is installed within each respective cooling chamber 90. Each insert first sidewall 120 and 122 is convex and defines a suction side of each respective insert 102 and 104, and each insert second sidewall is concave and defines a pressure side of each respective insert 102 and 104. Respective pairs of insert sidewalls 120 and 124, and 122 and 126, are joined at respective leading edges 128 and 130, and at respective trailing edges 132 and 134.

Lead insert first sidewall 120 defines a suction side of lead insert 102 and includes a first plurality of openings 140 that extend therethrough to a cavity 142 defined therein. Lead insert second sidewall 124 includes a second plurality of openings 144 that extend therethrough to cavity 142. First and second sidewall openings 140 and 144 of insert 102 are biased to facilitate cooling a suction side 80 of lead airfoil vane 76, more than a pressure side 82 of lead airfoil vane 76. In the exemplary embodiment, the plurality of first sidewall openings 140 are greater than that required to achieve substantially equal surface temperatures when compared to the plurality of second sidewall openings 144. The ratio of ninety first sidewall openings 140 to ninety-seven second sidewall openings 144 results in biased cooling and is in contrast to known inserts which have a ratio of seventy-six first sidewall openings to one hundred thirty-seven second sidewall openings which results in cooling all four airfoil sidewalls substantially equally. In an alterative embodiment, the larger volume of air is facilitated because insert first sidewall 120 includes openings 140 which are larger in diameter than corresponding openings 144 extending through insert second sidewall 124. It should be noted that the arrangement of openings 140 and 144 with respect to each respective sidewall 120 and 124 is variable. Furthermore, the number and size of openings 140 and 144 is also variable.

Trailing insert first sidewall 122 defines a suction side of trailing insert 104 and includes a first plurality of openings 150 that extend therethrough to a cavity 152 defined therein. Trailing insert second sidewall 126 includes a second plurality of openings 154 that extend therethrough to cavity 152. First sidewall openings 150 permit a larger volume of cooling air to pass therethrough than second sidewall openings 154. More specifically, insert 104 is biased to facilitate cooling a suction side 80 of trailing airfoil vane 78, more than a pressure side 82 of trailing airfoil vane 78. In the exemplary embodiment, the larger volume of air is facilitated because the plurality of first sidewall openings 150 outnumber the plurality of second sidewall openings 154. More specifically, in the exemplary embodiment, first sidewall 122 includes one hundred forty-two openings 150, and second sidewall 126 includes ninety-seven openings 154. In an alterative embodiment, the larger volume of air is facilitated because insert first sidewall 122 includes openings 150 which are larger in diameter than corresponding openings 154 extending through insert second sidewall 126. It should be noted that the arrangement of openings 150 and 154 with respect to each respective sidewall 122 and 126 is variable. Furthermore, the number and size of openings 150 and 154 is also variable.

Each nozzle 50 is in flow communication with a cooling system (not shown) that directs cooling air into each airfoil vane cooling chamber 90 for internal cooling of nozzle airfoil vanes 52. Specifically, the cooling system directs cooling air into each airfoil vane insert 100, which in-turn, channels the cooling air for cooling airfoil vanes 52. In addition to being biased to facilitate cooling a suction side of each respective airfoil vane 76 and 78, nozzle inserts 100 are biased to facilitate cooling trailing airfoil vane 78 more than lead airfoil vane 76. More specifically, trailing insert openings 150 and 154 are biased such that a larger volume cooling air is directed towards trailing airfoil vane 78 through trailing insert 104 than is directed through lead insert 102 towards lead airfoil vane 76. In the exemplary embodiment, the larger volume of air is facilitated because the plurality of trailing airfoil vane first sidewall openings 150 outnumber the plurality of, lead airfoil vane first sidewall openings 140. In an alternative embodiment, the larger volume of air is facilitated by varying the size of trailing airfoil vane openings 150 in comparison to lead airfoil vane openings 140.

During operation, cooling air is routed through the cooling system into nozzle 50, which may not be thermally loaded or mechanically stressed equally between adjacent airfoil vanes 76 and 78. More specifically, due to gas loading, thermal variations, and mechanical loading, more mechanical and thermal stresses are induced and transmitted through trailing airfoil vane 78 than through lead airfoil vane 76. Because nozzle inserts 102 and 104 provide nozzle 50 with a cooling scheme that may be customized to particular applications, cooling air supplied to nozzle 50 is allocated more to a suction side 80 of the airfoil vanes 52 than to a pressure side 82 of the airfoil vanes 52. Accordingly, as cooling air is channeled into nozzle 50, inserts 102 and 104 direct cooling air towards a respective nozzle airfoil vane 76 and 78. The cooling air exits outwardly from each nozzle airfoil vane 52 through a plurality of airfoil trailing edge openings (not shown), and thermal stresses induced within each individual airfoil vane 76 and 78 are facilitated to be reduced. Furthermore, by biasing the cooling airflow to cool trailing airfoil vane 78 more than lead airfoil vane 76, thermal stresses across nozzle 50 are facilitated to be controlled. As a result, although a maximum temperature on each airfoil vane concave surface is increased, the thermal stresses induced in nozzle 50 are facilitated to be controlled to counteract the mechanical stresses, thus facilitating increasing a useful life of nozzle 50.

The above-described turbine nozzle includes a pair of inserts that enable a cooling scheme for the nozzle to be customized to particular applications. Specifically, the inserts bias the distribution of cooling air supplied to the nozzle more to the suction side of each of the airfoil vanes, and more to the trailing airfoil vane in the doublet. As a result, the inserts facilitate controlling thermal stresses induced within the nozzle, and thus, facilitate increasing the useful life of the nozzle in a cost-effective and reliable manner.

While the invention has been described in terms of various specific embodiments, those skilled in the art will recognize that the invention can be practiced with modification within the spirit and scope of the claims.

What is claimed is:

1. A method for assembling a turbine nozzle for a gas turbine engine, said method comprising:

providing a hollow doublet including a leading airfoil vane and a trailing airfoil vane coupled by at least one platform, wherein each airfoil vane includes a first sidewall and a second sidewall that extend between a respective leading and trailing edge;

inserting an insert into at least one of the airfoil vanes, wherein the insert includes a first sidewall including a first plurality of cooling openings that extending therethrough, and a second sidewall including a second plurality of cooling openings extending therethrough, and wherein the first plurality of cooling openings facilitie cooling the airfoil more than the second plurality of cooling openings;

inserting second insert into the remaining airfoil vane, wherein the first and second inserts non-identical.

2. A method in accordance with claim 1 wherein each airfoil vane includes a pressure side and a suction side, inserting an insert into at least one of the airfoil vanes further comprises inserting an insert into at least one of the airfoil vanes to facilitate biasing cooling airfoil towards the suction side of the airfoil vane.

3. A method in accordance with claim 1 wherein the first sidewall of each airfoil vane is convex, and the second sidewall of each airfoil vane is concave, inserting an insert into at least one of the airfoil vanes further comprises inserting an insert into at least one of the airfoil vanes to facilitate biasing cooling airfoil towards the convex side of the airfoil vane.

4. A method in accordance with claim 1 wherein inserting an insert into at least one of the airfoil vanes further comprises inserting a first insert into the leading airfoil vane and a second insert into the trailing airfoil vane to facilitate cooling the trailing airfoil vane more than the leading airfoil vane.

5. A method in accordance with claim 1 wherein inserting an insert into at least one of the airfoil vanes further comprises inserting a first insert into the leading airfoil vane and a second insert into the trailing airfoil vane to facilitate reducing thermal stresses within the airfoil nozzle.

6. A method of operating a gas turbine engine, said method comprising:

directing fluid flow through the engine using at least one turbine airfoil nozzle that includes a leading airfoil and a trailing airfoil coupled by at least one platform that is formed integrally with the leading and trailing airfoils, and wherein each respective airfoil includes a first sidewall and a second sidewall that extend between respective leading and trailing edges to define a cavity therein; and directing cooling air into the turbine airfoil nozzle such that the nozzle trailing airfoil is cooled more than the leading airfoil.

7. A method in accordance with claim 6 wherein directing cooling air into the turbine airfoil nozzle further comprises directing airflow into each respective airfoil cavity through an insert installed within the turbine nozzle to facilitate reducing thermal stresses within the turbine airfoil nozzle.

8. A method in accordance with claim 6 wherein directing cooling air into the turbine airfoil nozzle further comprises directing airfoil through at least one insert installed within the turbine nozzle that includes a first plurality of cooling openings in flow communication with the airfoil first sidewall, and a second plurality of cooling openings in flow communication with the airfoil second sidewall, wherein the first plurality of cooling openings facilitate cooling the airfoil more than the second plurality of cooling openings.

9. A method in accordance with claim 8 wherein the first sidewall defines a suction side of the respective airfoil, and the second sidewall defines a pressure side of the respective airfoil, directing cooling air into the turbine airfoil nozzle further comprises biasing airflow entering the airfoil with the insert towards the suction side of the airfoil.

10. A method in accordance with claim 8 wherein the first sidewall is convex, and the second sidewall is concave, directing cooling air into the turbine airfoil nozzle further comprises biasing airflow entering the airfoil with the insert towards the convex side of the airfoil.

11. A method in accordance with claim 6 wherein directing cooling air into the airfoil nozzle further comprises directing airflow into each respective airfoil through a pair of non-identical inserts installed within the turbine nozzle, such that the trailing airfoil is biased to receive more cooling air flow than the leading airfoil.

12. A turbine nozzle for a gas turbine engine, said nozzle comprising:

a pair of identical airfoil vanes coupled by at least one platform that is formed integrally with said airfoil vanes, each said airfoil vane comprising a first sidewall and a second sidewall connected at a leading edge and a trailing edge to define a cavity therebetween, *said airflow vane first sidewall defines an airfoil vane suction side, said airfoil vane second sidewall defines an airfoil vane pressure side*; and at least one inset configured to be inserted within said airfoil vane cavity and comprising a first sidewall and a second sidewall, *said insert first sidewall is adjacent said airfoil vane first sidewall,* said insert first sidewall comprising a first plurality of openings extending therethrough for directing cooling air towards at least one of said airfoil vane first and second sidewalls, said insert second sidewall comprising a second plurality of openings extending therethrough for directing cooling air towards at least one of said airfoil vane first and second sidewalls, said first plurality of openings configured to facilitate more vane sidewall cooling than said second plurality of openings, said first plurality of cooling openings is greater than said insert second plurality of cooling openings.

[13. A nozzle in accordance with claim 12 wherein said airfoil vane first sidewall defines an airfoil vane suction side, said airfoil vane second sidewall defines an airfoil vane pressure side, said at least one insert further configured to be inserted within at least one airflow cavity such that said insert first sidewall is adjacent said airfoil vane first sidewall.]

14. A nozzle in accordance with claim [13] *12* wherein said airfoil vane first sidewall is convex, said airfoil vane second sidewall is concave, said insert further configured to facilitate cooling said airfoil vane first sidewall more than said airfoil vane second sidewall.

15.A nozzle in accordance with claim [13] *12* wherein said at least one insert further configured to be inserted such that said insert first sidewall is in flow communication and adjacent said airfoil vane first sidewall, said insert first sidewall is convex, said insert second sidewall is concave.

16. A nozzle in accordance with claim [13] *12* wherein said pair of airfoil vanes further comprise a leading airfoil vane and a trailing airfoil vane, said at least one insert further comprises a first insert installed within said leading airfoil vane, and a non-identical second insert installed within said tailing airfoil vane, said inserts configured to facilitate cooling said trailing airfoil vane more than said leading airfoil vane.

17. A nozzle in accordance with claim [13] *12* wherein said at least one insert further configured to facilitate reducing thermal stresses within said nozzle.

*18. A turbine nozzle for a gas turbine engine, said nozzle comprising:*

*a leading airfoil; and*

*a trailing airfoil; and*

*at least one platform that is formed integrally with said leading and trailing airfoils, and wherein each respective airfoil comprises a first sidewall and a second sidewall that extend between respective leading and trailing edges to define a cavity therein; and*

*at least one insert inserted within said airfoil cavity, said turbine nozzle coupled to a cooling system configured to direct cooling air into the turbine airfoil nozzle such that a portion of said trailing airfoil is cooled more than other portions of said trailing airfoil, and such that said trailing airfoil first sidewall is cooled more than said leading airfoil first sidewall.*

*19. A turbine nozzle in accordance with claim 18 wherein said turbine airfoil nozzle is further configured to receive cooling air such that a portion of the leading airfoil is cooled more than other portions of the leading airfoil.*

*20. A turbine nozzle in accordance with claim 18 wherein said turbine nozzle is further comprises:*

*a first insert configured to be inserted within one of the airfoil vanes, wherein the first insert comprises a first sidewall including a first plurality of cooling openings extending therethrough, and a second sidewall including a second plurality of cooling openings extending therethrough, and wherein the first plurality of cooling openings facilitate cooling the airfoil more than the second plurality of cooling openings, and wherein the first plurality of cooling openings is greater than the second plurality of cooling openings; and*

*a second insert configured to be inserted within the remaining airfoil vane.*

*21. A turbine nozzle in accordance with claim 20 wherein said first and second inserts are identical.*

*22. A turbine nozzle in accordance with claim 20 wherein said first and second inserts are non-identical.*

*23. A turbine nozzle in accordance with claim 20 wherein said first sidewall defines a pressure side of the respective airfoil, and said second sidewall defines a suction side of the respective airfoil, said insert configured to bias cooling airflow entering the airfoil towards the suction side of the airfoil.*

*24. A turbine nozzle in accordance with claim 20 wherein said first sidewall is concave, and said second sidewall is convex, said insert configured to bias cooling airfoil entering the airfoil towards the concave side of the airfoil.*

*25. A turbine nozzle in accordance with claim 18 wherein said nozzle comprises a pair of non-identical inserts configured to bias the cooling air directed to the trailing airfoil more than the cooling air flow directed to the leading airfoil.*

* * * * *